US005606607A

United States Patent [19]
Yamaguchi et al.

[11] Patent Number: 5,606,607
[45] Date of Patent: Feb. 25, 1997

[54] TWO-WAY COMMUNICATIONS EARSET

[75] Inventors: Noboru Yamaguchi, Yokohama; Masao Konomi, Tokyo, both of Japan

[73] Assignee: Pan Communications, Inc., Tokyo, Japan

[21] Appl. No.: 459,878

[22] Filed: Jun. 6, 1995

Related U.S. Application Data

[62] Division of Ser. No. 413,928, Mar. 30, 1995, Pat. No. 5,448,637, which is a continuation of Ser. No. 45,057, Apr. 9, 1993, abandoned.

[30] Foreign Application Priority Data

Oct. 20, 1992 [JP] Japan ................................. 4-306453
Mar. 17, 1993 [JP] Japan ................................. 5-082783

[51] Int. Cl.⁶ ................................................. H04M 1/00
[52] U.S. Cl. ...................... 379/430; 381/68.1; 381/68.6
[58] Field of Search ................................. 379/430, 433, 379/434; 381/68, 68.1, 68.4, 68.7, 69, 155, 169, 163, 158, 168, 183, 187

[56] References Cited

U.S. PATENT DOCUMENTS

| | | | |
|---|---|---|---|
| 2,255,249 | 9/1941 | Greibach | 179/121 |
| 2,255,250 | 9/1941 | Greibach | 179/121 |
| 3,258,533 | 6/1966 | Bredon | 179/1 |
| 3,588,382 | 6/1971 | Reedyk | 179/111 E |
| 3,749,853 | 7/1973 | Ely et al. | 387/68.1 |
| 3,869,584 | 3/1975 | Wilde | 179/156 |
| 3,876,843 | 4/1975 | Moen | 179/107 |
| 3,963,881 | 6/1976 | Fraim et al. | 179/111 |
| 4,009,355 | 2/1977 | Poradowski | 179/121 |
| 4,017,797 | 4/1977 | Laessiq | 325/16 |
| 4,363,937 | 12/1982 | Bruna | 381/155 |
| 4,463,222 | 7/1984 | Poradowski | 179/121 |
| 4,489,442 | 12/1984 | Anderson et al. | 381/81 |
| 4,591,668 | 5/1986 | Iwata | 179/121 |
| 4,696,045 | 9/1987 | Rosenthal | 381/114 |
| 4,862,509 | 8/1989 | Towsend | 381/163 |
| 5,109,410 | 4/1992 | Suhami et al. | 379/430 |
| 5,134,659 | 7/1992 | Moseley | 381/72 |
| 5,164,984 | 11/1992 | Suhami et al. | 379/444 |
| 5,278,912 | 1/1994 | Waldhauer | 387/68.4 |
| 5,363,444 | 11/1994 | Norris | 379/430 |

FOREIGN PATENT DOCUMENTS 159662 12/1980 Japan ............................. 379/428

OTHER PUBLICATIONS

Miles, U.S. Statutory Invention Registration No. H417, "Headset for Ambient Noise Suppression," published Jan. 5, 1988.

Carter, "Active Noise Reduction," Bose Corporation, Aerospace Medical Research Laboratory, Wright Patterson Air Force Base, Ohio, Jan. 1984.

*Primary Examiner*—Krista M. Zele
*Assistant Examiner*—Jack Chiang
*Attorney, Agent, or Firm*—Finnegan, Henderson, Farabow, Garrett & Dunner, L.L.P.

[57] ABSTRACT

A one piece two way voice communications earset which is situated in or at the ear of the user and which includes either two unidirectional microphones having their outputs combined or a single bi-directional microphone.

3 Claims, 9 Drawing Sheets

TWO-WAY COMMUNICATIONS EARSET

This is a division of application Ser. No. 08/413,928, filed Mar. 30, 1995, now allowed on May 16, 1995, U.S. Pat. No. 5,448,637, which is a continuation of application Ser. No. 08/045,057 filed Apr. 9, 1993, now abandoned.

BACKGROUND OF THE INVENTION

The present invention relates to an earset for use in two-way voice communications which is worn in or at an ear canal of a user and which is operated hands-free. The earset of the present invention can transmit the user's voice and receive voice signals from another party simultaneously without causing feedback.

Modern wireless technologies have advanced to the extent that portable, wireless and mobile telephones have become small in size and are used widely. Such portable telephones typically include a handset requiring the use of at least one hand for communication.

A disadvantage of the handset type of telephone is that they are inconvenient to use in front of a computer or while driving a car. In such instances, the user must use a hand to hold the handset while typing at the keyboard, which is very difficult to do, or while holding the steering wheel of a car, which is dangerous. Alternatively, the user must hold the telephone handset to their ear with their shoulder, which is very uncomfortable.

In order to solve this drawback, hands-free telephones have been developed. A conventional two-way communications apparatus used with hands-free telephones comprises a headband including a speaker positioned in front of one ear and a boom attached to the headband with a small microphone at one end of the boom. With the boom connected to the headband, the microphone extends in front of the mouth of the user. However, this type of hands-free telephone is not convenient to use because it is cumbersome and because it disturbs the hair of the user.

Another conventional two-way communications system used with hands-free telephones includes a structure which hangs from the ear of the user. This type of communications system includes a speaker positioned in front of the user's ear and a boom having a microphone extending in front of the mouth of the user. Again, such a structure is not convenient for the user because it typically does not hang well at the ear and because it is bulky to carry owing to the boom.

Alternatively, as shown in FIG. 1, yet another conventional two-way communications system includes a receiver section 1 with a speaker 1a which is placed in the user's ear canal. Sound is transmitted to the user via an opening 1b in the back of the speaker 1a. The two way communications system also includes a transmitter section 3 which is located relatively close to the user's mouth. The transmitter section 3 includes a microphone 3a.

In the conventional two-way communications system shown in FIG. 1, however, the transmitter section 3 is attached to the receiver section 1 by a chord 2. The cord 2 also extends past the transmitter section 3 and is connected to a telephone terminal (not shown).

The two-way communications system shown in FIG. 1 does not require hands to operate. However, due to the connection of the transmitter section 3 by the cord 2, the microphone 3a dangles. With such a configuration, the microphone 3a must be omni-directional causing noise when the microphone 3a rotates at the chord 2. Additionally, with the two-way communications system shown in FIG. 1, the sound intake of the microphone 3a may be blocked by the face or clothing of the user, causing a decrease in the quality of the transmitted voice signals. Moreover, contact between the transmitter section 3 and the clothing of the user tends to cause noise.

Conventional two-way communications systems, such as those shown in FIG. 2 and FIG. 3 attempt to overcome the deficiencies described above with the two-way communications system shown in FIG. 1.

The conventional two-way communications earsets shown in FIGS. 2 and 3 integrate the speaker 1a and the microphone 3a into a single case 4. The L-shaped case 4 houses the speaker 1a in one leg and houses the microphone 3a in the other leg. In the embodiment shown in FIG. 2, the speaker 1a has a single opening 4a at a back portion thereof. Alternatively, as shown in FIG. 3, the speaker 1a may have a plurality of holes 4a'. The microphone 3a has an opening 4b through which signals are received. There is a chord 2 coming out from the lower part of the L-shaped case 4 which is connected to a telephone terminal (not shown).

By incorporating the speaker 1a and the microphone 3a in the case 4, conventional two-way communications earsets shown in FIGS. 2 and 3 solve many of the problem discussed above related to the communications system shown in FIG. 1. However, the two-way communications earsets of FIGS. 2 and 3 cause feedback because sound that leaks out from the opening 4a is fed into the microphone 3a though sound intake hole 4b. Therefore, in the communications earsets shown in FIGS. 2 and 3, either the sound volume of the speaker 1a has to be controlled below a certain level or the sensitivity of the microphone 3a has to be kept below a certain level to reduce the effects of feedback.

However, if the sound volume is maintained at a low level, the user may find it difficult to hear voice signals due to the presence of ambient noise. In an effort to reduce the effects of ambient noise, the user may cover his ear with his hand. Unfortunately, this significantly increases the acoustic coupling between the speaker and microphone, causing even more feedback.

In addition, with two-way communications earsets shown in FIGS. 2 and 3, voice signals of the user are picked up at the ear, which is about 14 cm away from the user's mouth. Conventional telephone handsets are designed to pick up voice signals directly in front of the user's mouth which are approximately 2.5 cm away from the microphone. At this distance, the level of the voice signal is approximately 94 dBSPL. Because the two-way communications earsets shown in FIGS. 2 and 3 receive voice signals further away from the mouth than conventional handsets, the signals are approximately 14 dBSPL (sound pressure level) lower than those received by a conventional telephone handset. Because the voice signals are received from further away, they require greater amplification. As a result, the systems shown in FIGS. 2 and 3 tend to pick up more ambient noise and room reverberation, both of which make the received voice signals less intelligible.

Accordingly, an object of the present invention is to provide an earset for use in two-way voice communications which is worn in or at an ear canal of the user and which is operated hands-free.

Another object of the present invention is to provide an earset which transmits the user's voice and receives voice signals from another party simultaneously without causing feedback caused by acoustic or mechanical coupling between the speaker and the microphone.

A further object of the present invention is to provide a two-way communications earset which delivers an adequate level of sound to the user without causing feedback, while also delivering an adequate level of sound to a receiver a the other end of the communication system.

A still further object of the present invention is to provide a two-way voice communications earset which is less sensitive to ambient noise at a level almost equal to a telephone handset and to room reverberation so that clear voice communications can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects in accordance with the purposes of the present invention, as embodied and described herein, the earset of the present invention comprises a one piece two-way simultaneous voice transmitting and receiving device comprising a receiver for emitting sound primarily to the ear canal of a user and a transmitter, coupled to the receiver, and located outside the ear canal, comprising a first microphone adapted to be located at a first position relative to the mouth of the user and outputting a first signal, a second microphone spaced a distance away from the first microphone and adapted to be located at a second position relative to the mouth of the user further from the mouth of the user than the first position, and outputting a second signal and means for detecting the first and second signals.

The earset of the present invention further comprises a one piece two-way simultaneous voice transmitting and receiving device comprising a receiver, emitting sound primarily to the ear canal of a user, and a transmitter, coupled to the receiver and located outside the ear canal, comprising a microphone with bi-directional directivity having two sound receiving ends, a cavity housing the microphone substantially at a central portion thereof and directed toward the mouth of the user and sound absorbing materials placed with the cavity and abutting the sound receiving ends of the microphone.

BRIEF DESCRIPTION OF THE DRAWINGS

The accompanying drawings, which are incorporated in and constitute a part of the specification, illustrate the presently preferred apparatus of the present invention and, together with the general description given above and the detailed description of the preferred embodiments given below serve to explain the principles of the invention. In the drawings.

DETAILED DESCRIPTION OF THE PREFERRED EMBODIMENTS

Figure 4:
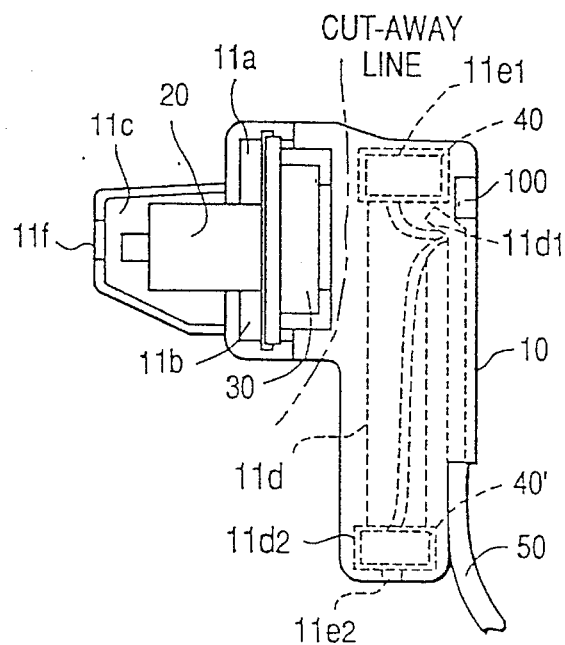
FIG. 4 is a sectional view of a two-way communications earset according to a first embodiment of the present invention.

FIG. 4 is a sectional view of a two-way communications earset according to a first embodiment of the present invention. The embodiment shown in FIG. 4 comprises an earset 10 which has an L-shaped configuration. The earset 10 is preferably made of plastic and includes an enlarged portion 11a which is inserted in the ear of the user. The enlarged portion 11a includes an earset component portion 11b and an insertion portion 11c.

The enlarged portion 11a is placed in the user's ear auricle and the insertion portion 11c is inserted into the ear canal.

The insertion portion 11c is preferably shaped so that the ear canal of the user will not be completely clogged by the earset 10 and so that the earset 10 will not be so loose as to cause feedback due to leaked sound.

Figure 1:
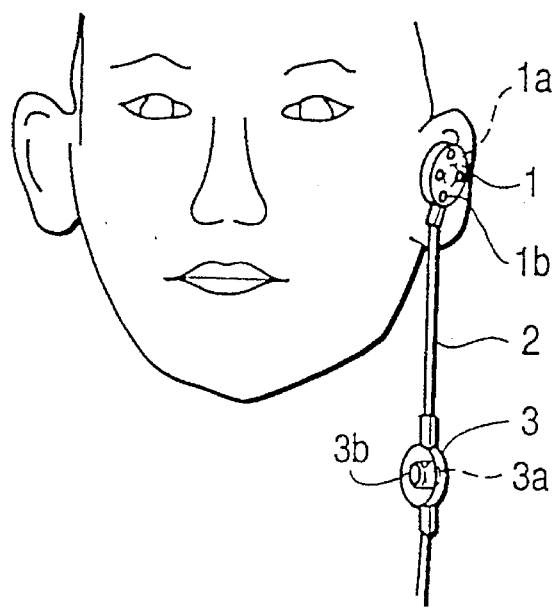
FIG. 1 is a sectional view of a conventional earset with a microphone attached to a cord.
Figure 2:
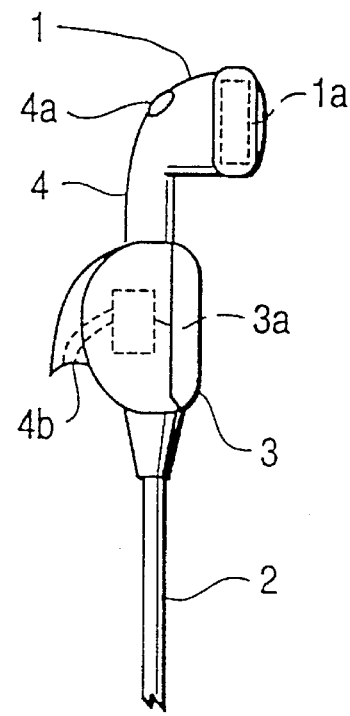
FIG. 2 is a side sectional view of a conventional one piece earset adapted to be worn in a user's ear.
Figure 3:
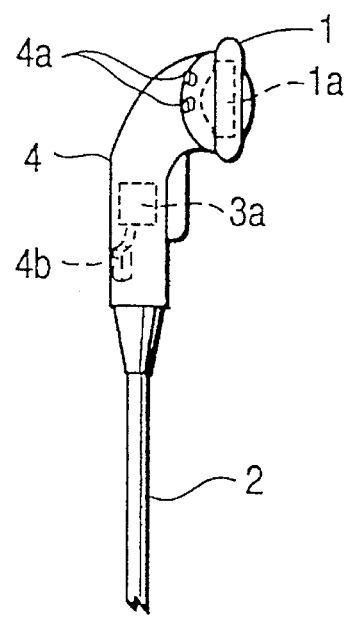
FIG. 3 is a side sectional view of another conventional one piece earset adapted to be worn in a user's ear.

A speaker 20 is housed in the earset component portion 11b and is supported by resilient material 30. The output of the speaker 20 is input to the insertion part 11c and is fed into the ear canal of the user through hole 11f. The speaker 20 can preferably be either a magnetic-type speaker or dynamic-type speaker. As shown in FIG. 1, the speaker 20 is situated in the earset component portion 11b. However, in accordance with the preset invention, the speaker 20 can be placed in an alternate location, so long as the output from the speaker 20 is guided into the ear canal of the user.

The earset 10 also includes a cylindrical cavity 11d. At the ends of the cavity 11d are housing spaces 11d1 and 11d2. The housing spaces 11d1 and 11d2 are connected to the outside of the earset 10 through two respective holes 1e1 and 1e2. Two electret pieces 40 and 40' are respectively housed in the two housing spaces 11d1 and 11d2. Each of the electret pieces 40 and 40' is preferably a small and sensitive.

Additionally, in a preferred embodiment of the present invention, the electret pieces 40 and 40' are preferably back-type electret so that they are immune to vibrations emanating from the earset 10 and from extraneous noise from the wires connecting the elements of the earset 10. Such wires may include the wire 50, which is substantially parallel to the cylindrical cavity 11d, and is led to the outside of the earset 10 and the wires coming from speaker 20 and electret pieces 40 and 40'.

The earset 10 shown in FIG. 4 also preferably includes a combination circuit 100 which combines the outputs of the electret pieces 40 and 40'. The combination circuit is explained in more detail below, but preferably is coupled to the output wires of the electret pieces 40 and 40' and has its output coupled to wire 50. As shown in FIG. 4, the combination circuit 100 is located within the cylindrical portion 11d. However, in accordance with the present invention, the combination circuit 100 may be located at any convenient place in the earset 10, so long as the outputs of the electret pieces 40 and 40' are input thereto.

Figure 5:
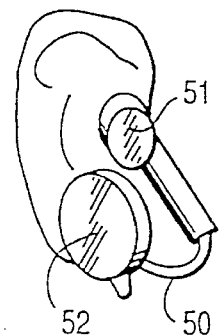
FIG. 5 is a side view of a second embodiment of a two-way communications earset according to the present invention placed in an ear of a user.

FIG. 5 shows an earset according to a second embodiment of the present invention. As shown in FIG. 5, the earset has a two-piece construction including a two-way wireless communication device 52 connected to an earset 51. The communication device 52 includes a transmitter/receiver at the front portion of the ear lobe. The communication device 52 also includes an integrated circuit (not shown) that transmits voice signals from electret pieces 40 and 40' to a station and receives voice signals from the station, and a combination circuit 100 that combines the outputs of electret pieces 40 and 40'.

The communication device 52 also includes a battery cell located at the back portion of the ear lobe. The battery cell and the transmitter/receiver remain connected to the ear lobe by a pinching mechanism located therebetween. The earset 51, shown in FIG. 5, is substantially the same as that shown in FIG. 4.

Figure 6:
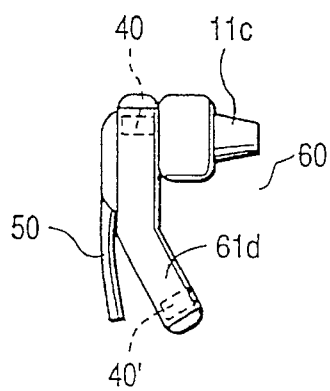
FIG. 6 is a sectional view of a two-way communications system according to a third embodiment of the present invention.

FIG. 6 is a side sectional view of an earset according to a third embodiment of the present invention. The earset 60 includes a cylindrical cavity 61d which preferably has a slightly folded cylindrical shape. With such a shape, the lower electret piece 40' is situated closer the user's mouth than the upper electret piece 40. With such a configuration, the lower microphone 40' picks up more of the user's voice signals that does the upper microphone 40 and therefore the users voice can be amplified to a greater extent than when the earset shown in FIG. 4 is used.

The operation of the earset according to any of he embodiments shown in FIGS. 4–6 will be described below, specifically with respect to FIG. 4. The enlarged portion 11a of the earset 10 is inserted into the user's ear auricle and the insertion part 11c is inserted into the ear canal. The shape of the insertion part 11c is formed so that the insertion part 11c will not clog the ear canal. With such a shape, the user can hear sound coming from the outside and therefore finds the earset 10 safe to use.

Additionally, the shape of the insertion part 11c is formed so that the insertion part 11c will not leak much sound. As shown in FIG. 4, the speaker 20 is preferably situated in the earset component portion 11b. However, the speaker 20 can be located in other places within the earset 10 as long as the output of the speaker 20 is output to the user's ear canal.

With the earset 10 situated in the user's ear, the user can hear sound from the speaker 20 that is sent via the wire 50 from a duplex transmitting and receiving terminal (not shown). The output of the speaker 2 is led to the ear canal via a hole 11f of the insertion part 11c.

The voice signal from the user reaches the earset 10 via holes 11e1 and 11e2, and then respectively reaches the electret pieces 40 and 40'. The voice signals are converted into electrical signals by electret pieces 40 and 40' and are sent after being combined by the combination circuit 100 via the wire 50 to the duplex voice transmitting and receiving terminal (not shown).

The earsets according to the embodiments shown in FIGS. 4–6 have a higher sensitivity to the voice signal of the user than to noise signals coming from places distant from to the user's mouth. This is because the lower electret piece 40' is located closer to the user's mouth than the upper electret piece 40. Thus, when the combination circuit 100 combines the outputs of the electret pieces 40 and 40', the voice signal of the user is output and noise signals from distant sources are nulled.

More specifically, if the output signals of the electret pieces 40 and 40' are in phase relative to the voice of the wearer, the combination circuit 100 preferably subtracts the output signals. If the output signals of the electret pieces are out of phase relative to the voice of the wearer, the circuit 100 preferably adds the outputs. However, regardless of whether the outputs are in phase or out of phase, in order achieve an effective cancellation of noise, preferably the electret pieces 40 and 40' are identical in shape and electrical performance characteristics.

Figure 7:
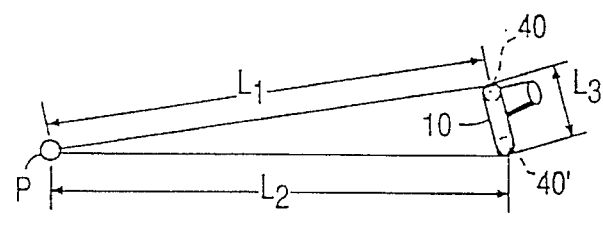
FIG. 7 is a side view showing the relative positioning of a sound source relative to the earset shown in FIG. 4.

The noise cancellation which is achieved by the earset according to the present invention is illustrated with respect to FIG. 7. FIG. 7 is a side view showing the relative positioning of a sound source relative to the earset 10 shown in FIG. 4. This explanation assumes that the two electret pieces 40 and 40' have identical electrical performance characteristics and the circuit 100 subtracts the outputs of the electret pieces 40 and 40'.

Typically, a sound source, having sound pressure P, transmits sound through the air and a microphone a distance L from the sound source receives the sound, producing an electrical output of V volts. The relation of P, V and L is as follows:

$$V = k \, P/L \quad (k \text{ is a constant related to a microphone}) \qquad (1)$$

In the earset according to the present invention including electret pieces 40 and 40', two voltages V and V' are produced. Additionally, the upper electret piece 40 is located a distance L1 from the sound source while the lower electret piece is located a distance L2 from the sound source P. According to equation (1) above, the difference between the outputs V and V' respectively from the electret pieces 40 and 40' the distances L1 and L2 from the sound source P and the microphone constants k and k' have the following relationship $$Vo=V1-V2=(k1\ P/L1)-(k2\ P/L2) \quad (2)$$

Assuming the two electret pieces 40 and 40' are identical in electrical performance such that k1=k2=k, the formula (2) can be simplified as follows:

$$Vo=V1-V2=kP\ (1-(L1/L2)) \quad (3)$$

If the distance between the electret pieces 40 and 40' is L3, and L1 and L2 are 10 times larger than L3, formula (3) shows that as L1 and L2 become almost equal, Vo becomes zero. In other words, as the distance to the noise source P increases, the difference between the outputs of the electret pieces 40 and 40' also approaches zero, so that no signal will be output from the earset 10 as a result of such a noise source P. Since L3 is designed to be around 5 cm, noise sources with a distance of 50 cm will not cause an produce an output from the earset.

Figure 8:
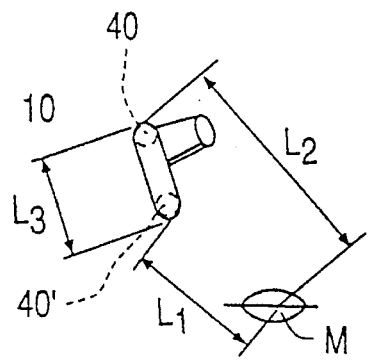
FIG. 8 is a side view showing the relative positioning of a mouth relative to the earset shown in FIG. 4.

FIG. 8 shows the distance relationship between the earset 10 and the mouth M of the user. Typically, the distance between the mouth and the entrance to an ear canal is approximately 14 cm. As shown in FIG. 8, the distance between the mouth M and the upper electret piece 40 is designated as L2, while the distance between the lower electret piece 40' and the user's mouth M is designated as L1. Because the distance L3 between electret pieces 40 and 40' is approximately 5 cm, the L1/L2 relationship becomes less than 1 in equation (3). As a result, a significant output is produced by the difference between the outputs of the electret pieces 40 and 40'. This output is primarily due to the voice signals of the user and is not due to ambient noise signals, which are effectively cancelled.

In the third embodiment of the present invention shown in FIG. 6, the lower electret piece 40' is preferably located closer to the user's mouth. With such a configuration, the ratio L1/L2 becomes even smaller because the distance between the user's mouth M and the lower electret piece 40' is decreased. As a result, the output signal Vo is greater than the output signal when using the first embodiment of the present invention shown in FIG. 4.

Figure 9:
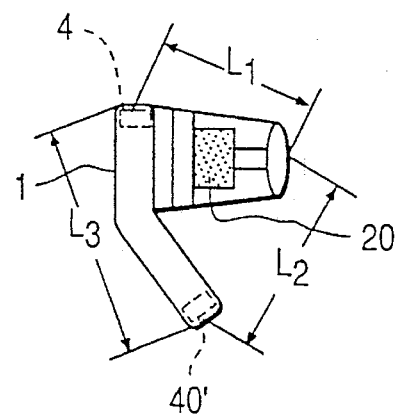
FIG. 9 is a side view showing the relative positioning of a speaker output relative to the earset shown in FIG. 6.

Using a combination of electret pieces 40 and 40', as shown in the first through third embodiments of the present invention, and the combination circuit 100 also helps to reduce feedback of the earset. As shown in FIG. 9, under this circumstance, the sound source P is the output of the speaker 20. As long as the distances between the speaker 20 and the electret pieces 40 and 40', shown in FIG. 9 as L1 and L2, respectively, are nearly equal, the output Vo, as evidenced from equation (3), becomes small, thus reducing feedback.

The electret pieces 40 and 40' used in the earset according to the present invention can be an omni-directional type or a unidirectional type. Unidirectional type electret pieces produce more directionality toward the user's mouth than do omni-directional type electret pieces and therefore may be preferable to omni-directional type microphones.

Figure 10:
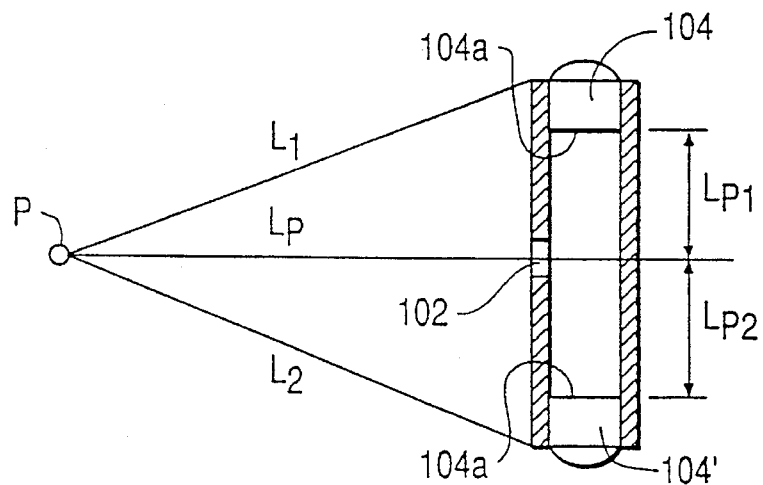
FIG. 10 is a side view showing the relative positioning of a sound source with respect to an alternative embodiment of the two-piece microphone.

FIG. 10 is a side sectional view of a dual microphone structure using two unidirectional microphones. As shown in FIG. 10, the lower electret piece 104' is directly opposite the upper electret piece 104 in the cylindrical cavity 101. The two electret pieces 104 and 104' are placed back to back at the ends of the cavity 101 so that directionality of the two electret pieces 40 and 40' is opposite. Therefore, when the earset with the unidirectional microphones shown in FIG. 10 is placed in a user's ear, the directionality of the lower electret piece 104' is toward the user's mouth while the directionality of the upper electret piece 104 is in a direction opposite to the mouth. More specifically, the directionality of the electret pieces 104 and 104' together form a figure eight, with a null point in the center.

In operation, the unidirectional electret pieces 104 and 104' require an input at the respective back surfaces 104a and 104a' of the electret pieces 104 and 104'. This input is provided by a hole 102 in the cylindrical cavity 101. Preferably, the hole 102 is placed at the null point of the directionality of the unidirectional microphones 104 and 104', that is in the center of the cylindrical cavity 102. More specifically, the hole 102 should be placed such that the distances to the respective back surfaces 104a and 104a' of the unidirectional microphones 104 and 104' are equal. As shown in FIG. 10, the distances to the back surfaces 104a and 104a' are Lp1 and Lp2. The distance from the sound source P to the hole 102 is Lp. In a preferred embodiment of the present invention, the distances from the sound source P to the back surfaces 104a and 104a' are equal so that the combination circuit 100, not shown in FIG. 10, can effectively reduce noise.

As well as being an input for the unidirectional microphones 104 and 104', the hole 102 can preferably also be used as an outlet for wires connecting the electret pieces 104 and 104' and the wire 50, shown in FIG. 4.

The combination circuit 100, which combines the outputs from the electret pieces 4 and 4', shown in FIGS. 4 and 7–9, 64 and 64', shown in FIG. 6 and 104 and 104', shown in FIG. 10, is explained below with respect to FIGS. 11–14.

Figure 11:
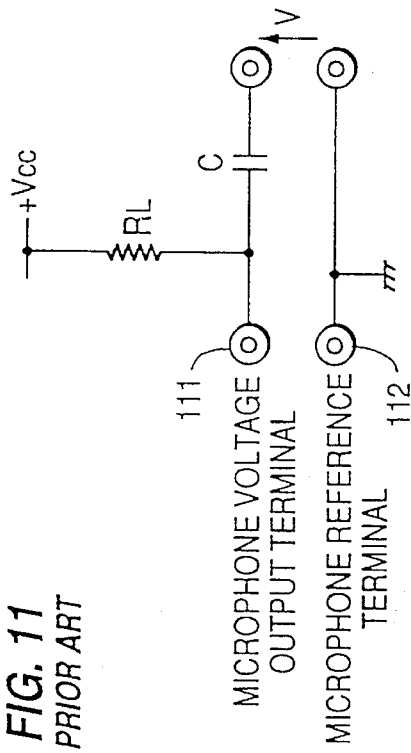
FIG. 11 is a circuit diagram of conventional circuit that produces an electret microphone output.

FIG. 11 is a circuit diagram of a conventional output circuit of a single electret microphone. As shown in FIG. 11, a positive direct voltage Vcc, a load resister RL and direct current cut-off capacitor C are connected to the microphone output terminal 111. An alternating voltage v appears as the output with respect to the microphone reference terminal 112. With the circuit of FIG. 11, only one output from a single microphone is produced.

Figure 12:
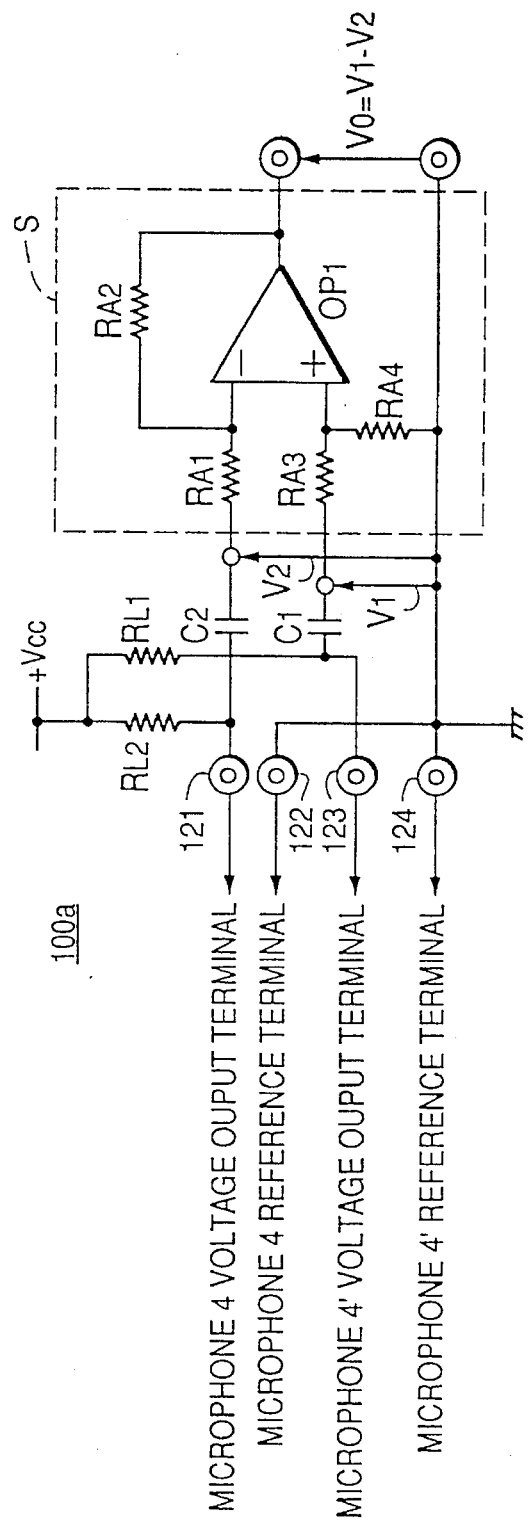
FIG. 12 is a circuit diagram of circuitry used in the earset of the present invention for subtracting the outputs of two microphones when the microphones are in phase.

However, in accordance with the present invention, the earset can have two microphones, the outputs of which must be combined. FIG. 12 shows a circuit diagram of a first combination circuit 100a to be used with the earset of the present invention. The combination circuit 100a, shown in FIG. 12 is similar to the circuit shown in FIG. 11 in that it includes direct voltage Vcc, load resistances RL1 and RL2, respectively of the microphones 40 and 40' and respective current cut-off capacitances C1 and C2.

The combination circuit 100a shown in FIG. 12 further includes a subtraction circuit S which outputs the difference between the outputs of the microphones 40 and 40', which are input, respectively at inputs 121 and 123. The combination circuit shown in FIG. 12 is used when the microphone elements are in phase. Reference voltages for the microphones 40 and 40' are provided at terminals 122 and 124. The two output signals of the microphones are respectively represented by v1 and v2.

The subtraction circuit S comprises an operational amplifier OP1 and resistors, RA1, RA2, RA3 and RA4. The operational amplifier and the resistors are configured such that the subtraction circuit S has no gain-relative to the input signals. As a result, the output of the operational amplifier OP1 is Vo=v1−v2.

In the combination circuit 100a shown in FIG. 12, the resistance of RA1 is preferably more than 20 times greater than the resistances of both RL1 and RL2. The capacitances of C1 and C2 are such that signals with frequencies higher than 50 Hz are passed. Moreover, if the outputs of the microphones which are input to the combination circuit 100a have equal sensitivities in their electrical performance, RL1 is preferably equal to RL2. However, if the microphones have different sensitivities, the values of the resistances RL1 and RL2 are preferably different so that such difference in the microphone sensitivities can be nulled.

Figure 13:
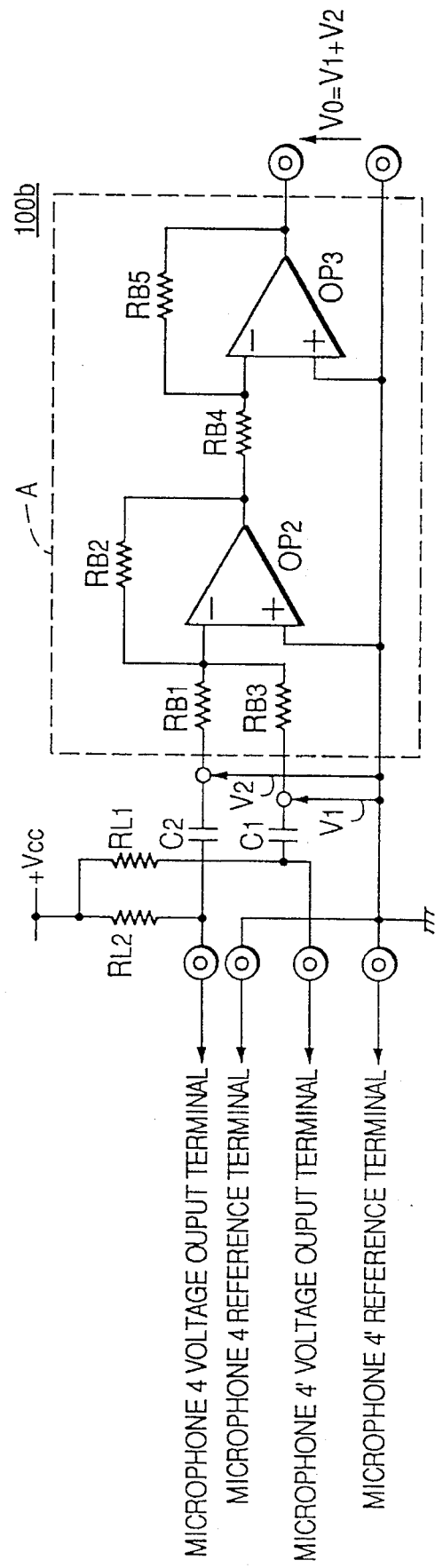
FIG. 13 is a circuit diagram of circuitry used in the earset of the present invention for adding the outputs of two microphones when the microphone outputs are out of phase.

FIG. 13 is a circuit diagram of a combination circuit to be used in an earset according to the present invention when the outputs of the microphones are out of phase. Like reference numerals in the combination circuit 100a shown in FIG. 12 are used in FIG. 13.

With the combination circuit 100b of FIG. 13, operational amplifiers OP2 and OP3 are used in combination with resistors RB1 through PRB5. The resistors are configured such that no gain is achieved with respect to the input signals. Thus, the addition circuit produces Vo=v1+v2.

It is noted that using the combination circuits 100a and 100b, shown respectively in FIGS. 12 and 13, differences in electrical performance of the microphones 40 and 40' can be compensated for by adjusting the values of the resistors. It is noted that in order to allow for continuous adjustments either one of the resistors RL1 and RL2 shown in FIGS. 12 and 13 can be replaced by a variable resistor.

Figure 14:
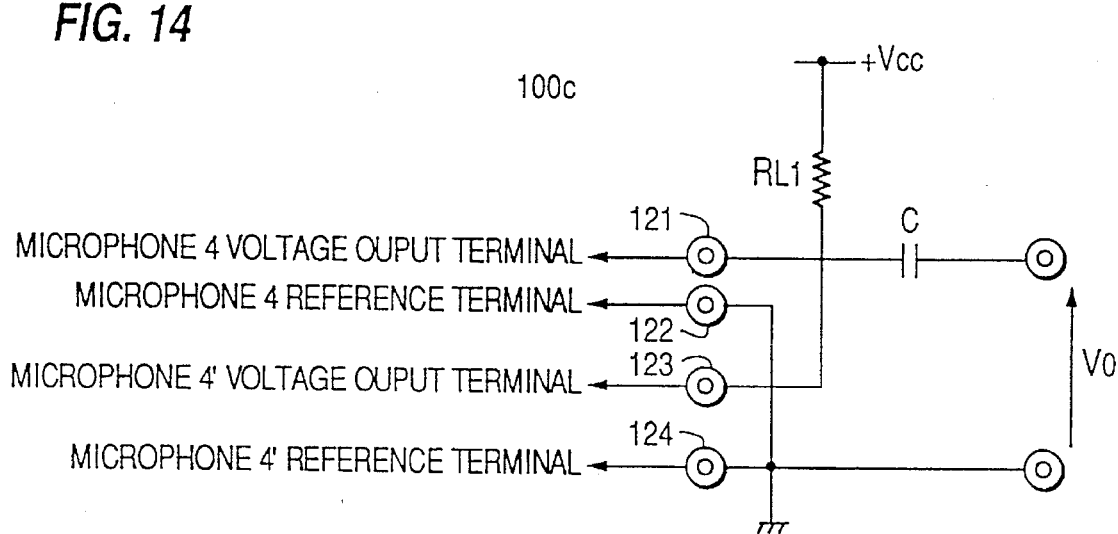
FIG. 14 is a circuit diagram of circuitry used in the earset of the present invention for adding the outputs of two microphones when the microphones are mutually out of phase.

For a perfectly matched pair of microphones 40 and 40' that are perfectly in phase, the combination circuit 100c shown in FIG. 14 can be employed. The combination circuit 100c shown in FIG. 14 is an idealized version of that shown in FIG. 12, assuming that the microphone outputs appearing at terminals 121 and 123 are identical in electrical characteristics so that adjustments made via the subtraction circuit S are unnecessary. With the combination circuit 100c, no adjustments for differences in sensitivity of the microphones 40 and 40' can be made and the output Vo is simply the difference between the outputs of the microphones 40 and 40'. Using the combination circuit 100c shown FIG. 14 the number of wires coming out from the earset can be reduced.

Figure 15:
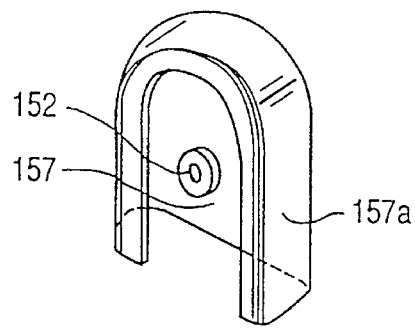
FIG. 15 is a side view of a two-way communications earset according to a fourth embodiment of the present invention.

FIG. 15 shows a back view of a two-way communications earset according to a fourth embodiment of the present invention. The earset 150, shown in FIG. 15, hangs at the ear of the user, instead of being inserted into the user's ear canal, as in the first through third embodiments of the present invention. The earset 150 includes an ear cover 157 having an arc shaped portion 157a that hangs at the base of the user's ear. Inside the ear cover 157 is a speaker 152, similar to the speaker 20 shown in FIG. 4.

Preferably, the ear cover 157 is constructed of an electrically-conductive plastic, which discharges static electricity that a user may pick up before inserting the earset 150 into their ear. If the ear cover is not constructed of such a material, the user may get a shock upon inserting the earset 150 into his ear.

Figure 16:
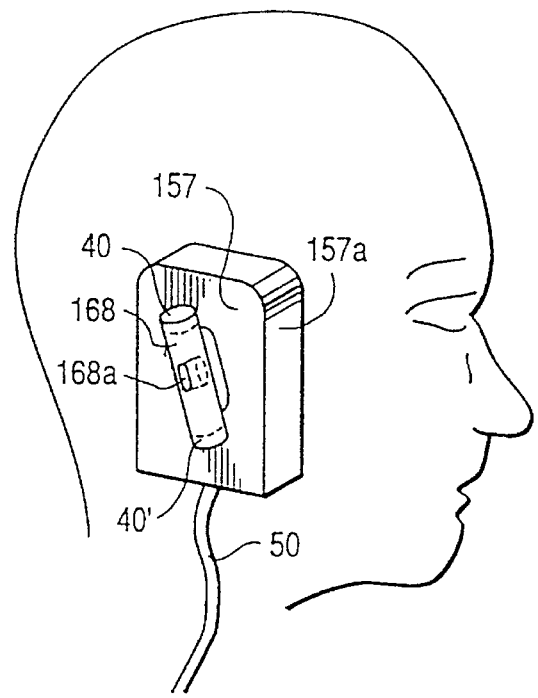
FIG. 16 is a side sectional view of the earset according to the fourth embodiment of the present invention hung on the user's ear.

FIG. 16 is a sectional view of the two-way communications earset according to the fifth embodiment of the present invention shown in FIG. 15 hung from a user's ear. As shown in FIG. 16, outside the ear cover 157 are the electret pieces 40 and 40' situated in cylindrical cavity 168, similar to those shown in FIG. 6. Additionally, there is a hole 168a in the cavity 168, which holds the electret pieces 40 and 40', which corresponds to the hole 102, shown in FIG. 10. The embodiment shown in FIGS. 15 and 16 is easy to wear since it hangs at the ear of the user. Additionally, because the ear cover 157 shields sound from the speaker 152, there is little feedback between the microphones 40 and 40' and the speaker 152.

Figure 17:
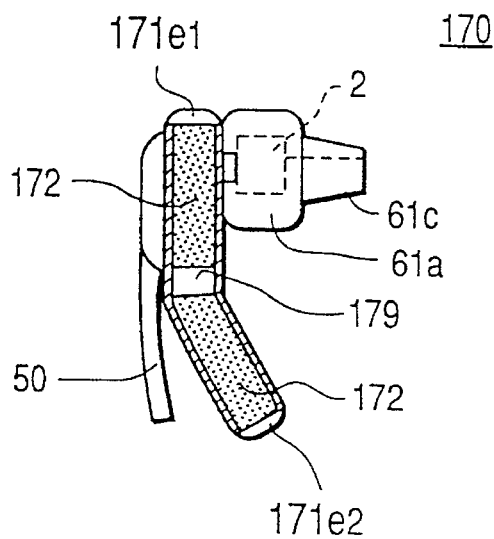
FIG. 17 is a sectional view of a two-way communications earset according to the fifth embodiment of the present invention.
Figure 18:
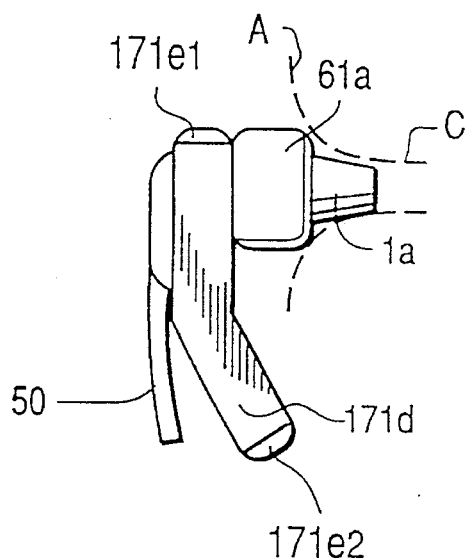
FIG. 18 is a side view of the earset according to the fifth embodiment inserted in a user's ear canal.

An earset according to the sixth embodiment of the present invention is shown in FIGS. 17 and 18. In the earset shown in FIGS. 17 and 18, the two microphones, shown in FIGS. 4–10 and 15–16, are replaced by a small single electret microphone 179 with bi-directional directivity. The bi-directional microphone 179 is located in the middle of a cylindrical cavity 171d, which is preferably similar to one of the cylindrical cavities shown in FIGS. 4 and 6. Between the sound intake holes 171e1 and 171e2 at either end of the cylindrical cavity 171d is sound absorbing materials 172. Preferably, the sound absorbing materials 172 are fibres or cotton filling which fill the spaces on both sides of the microphone 179.

Preferably, in the embodiment shown in FIG. 17, the total length of the cylindrical cavity 171d in which the microphone 179 is mounted should be less than 10 cm owing to the stability required for wearing the earset 170 in the user's ear. Accordingly, the microphone 179 is preferably mounted less than 5 cm from each end of the cylindrical cavity 171d.

It is noted, however, that the earset 170, shown in FIG. 17, can alternatively have the structure shown in FIG. 4, so long as the two electret microphones 40 and 40' are replaced by a single bi-directional microphone 179. Additionally, as with the embodiments shown in FIGS. 4–6, the location of the speaker 20 in FIG. 17 can be changed so long as the output of the speaker 20 is input to the ear canal of the user. The remainder of the earset 170 is the same as that shown in FIG. 6 and like reference numerals identify like elements.

Figure 19:
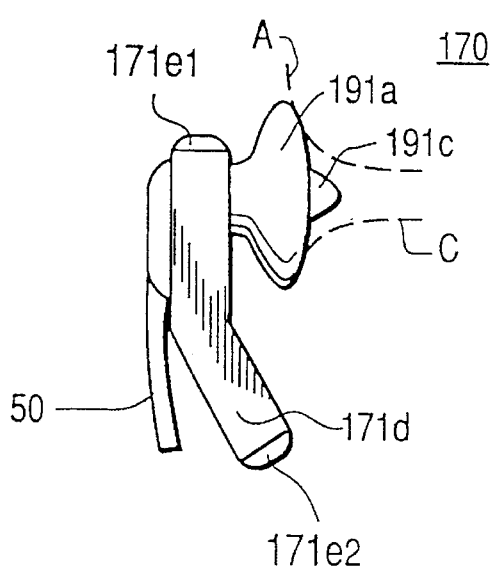
FIG. 19 is a side view of the earset according to the fifth embodiment with an alternative ear insertion shape.

FIG. 18 is a side view of the embodiment shown in FIG. 17 inserted in an ear canal C. As shown in FIG. 18, the insertion part 61c fits snugly in the ear canal C, while the enlarged portion 61a abuts the ear auricle A. Alternatively, the earset 170 can have an ear insertion configuration such as that shown in FIG. 19. FIG. 19 shows a modification of the earset 170 which includes an ear insertion portion 191c and an enlarged portion 191a. The ear insertion portion 191c does not fit snugly in the ear canal, but rather is placed at the entrance of the ear canal C. Additionally, in the modification shown in FIG. 19, the enlarged portion 191a surrounds a portion of the ear auricle A and maintains the earset 170 at the user's ear.

It should also be noted that the earsets according to the first through third embodiments of the present invention can include two bi-directional microphones 179 similar to that shown and described with respect to FIGS. 17–19. Using two bi-directional microphones in lieu of two unidirectional microphones 104 and 104' may be preferable because of the increased directivity achieved with bi-directional microphones.

Figure 21:
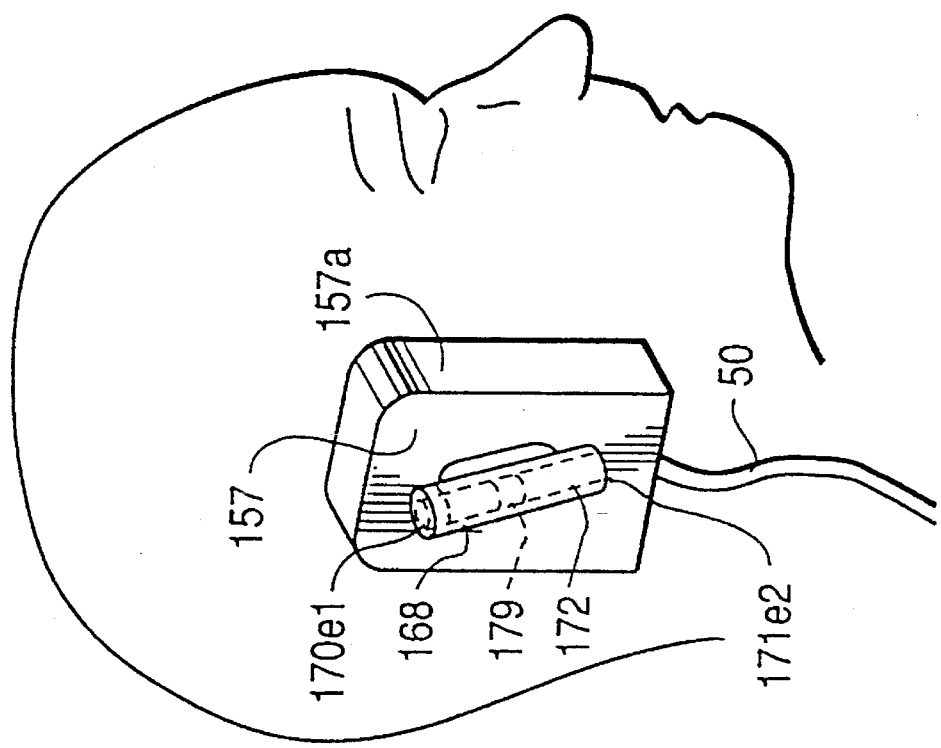
FIG. 21 is a side sectional view of the earset according to the sixth embodiment hung on an ear of a user.
Figure 20:
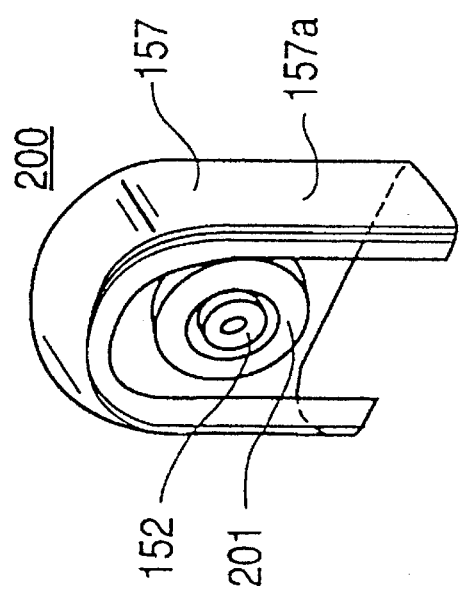
FIG. 20 is a back view of a two-way communications earset according to the sixth embodiment of the present invention.

An earset according to a sixth embodiment of the present invention is described with respect to FIGS. 20 and 21. The earset 200, shown in FIGS. 20 and 21 is shaped similar to the embodiment shown in FIGS. 15 and 16, but includes a single bi-directional microphone, as shown in the embodiment shown and described with respect to FIGS. 17–19. Like reference numerals from those figures are used in FIGS. 20 and 21.

As shown in FIG. 20, the earset 200 preferably includes a sound absorbing or shielding material 201 surrounding the speaker 152. Preferably, the sound absorbing or shielding material 201 is made of sponge and is ring-shaped surrounding the speaker 152. The sound absorbing or shielding material 201 prevents sound from leaking out of the space enclosed by the ear canal, the ear auricle and the ear cover 157.

FIG. 18 is a side sectional view of the earset 200 hung on the user's ear. As shown in FIG. 21, the bidirectional microphone 179 is placed within a cylindrical pipe 168. The cylindrical pipe 168 includes openings 202 and 202a which input signals to the bidirectional microphone 179 through the sound absorbing material 172. As with the embodiment shown in FIG. 16, signals are output through wire 50.

In the embodiments shown in FIGS. 17–21, using a single bi-directional microphone 179, the leakage of the sound from the speaker 20 is prevented because such leaked sound, if any, travels to the bi-directional microphone 179 at a direction in which the microphone sensitivity is not high. This is because the axis of directionality of the bi-directional microphone 179 is perpendicular to the direction of any leaked sound from the speaker 20. As a result, feedback between the bidirectional microphone 179 and the speaker 20 is less likely to occur, as compared with conventional earsets.

Additionally, the earsets shown in the embodiments of the present invention have a cylindrical cavity 11d, 168, and 171d. Preferably, the length of the cylindrical cavity in each of the embodiments of the present invention is less than 10 cm. In the embodiments shown in FIGS. 17–21, preferably the length of the cylindrical cavity below the bi-directional microphone 179 is less than 5 cm and is directed toward the user's mouth. Such a structure effectively shortens the distance from the mouth to the microphone 179, since the sound reaches the opening in the lower end of the cylindrical cavity pipe 1e2 without diffusion. Additionally, the sound absorbing material 172 within the cylindrical cavity 171d, shown in FIGS. 17–19, or 168, shown in FIG. 21, limits feedback between the speaker 20 and the bi-directional microphone 179 because the sound absorbing material 171 absorbs higher frequency signals, which are the major cause of such feedback.

The earsets according to the embodiments shown in FIGS. 17–21 are less sensitive to ambient noise, because ambient noise under normal circumstances tends to come from the horizontal plane. However, when placed in a user's ear, the bi-directional microphone 179 has its virtually on a vertical plane. So oriented, ambient noise impinges on the bi-directional microphone 179 from its least sensitive direction.

Additionally, as explained above with respect to the dual microphone embodiments, typically, sources of ambient noise tend to be more than 10 times the distance of that between the user's mouth and the bi-directional microphone 179. As explained in detail with respect to FIG. 7, the result of this distance is that the microphone will not output signals responsive to distant noise sources, but will primarily output voice signals of the user.

It is noted, however, that a small amount of ambient noise may still be heard using the earsets of the present invention. This is particularly true when the user stops talking and only ambient noise signals are picked up. In order to reduce such ambient noise, the circuitry shown in FIG. 22 can be used in combination with any of the earset embodiments of the present invention.

Figure 22:
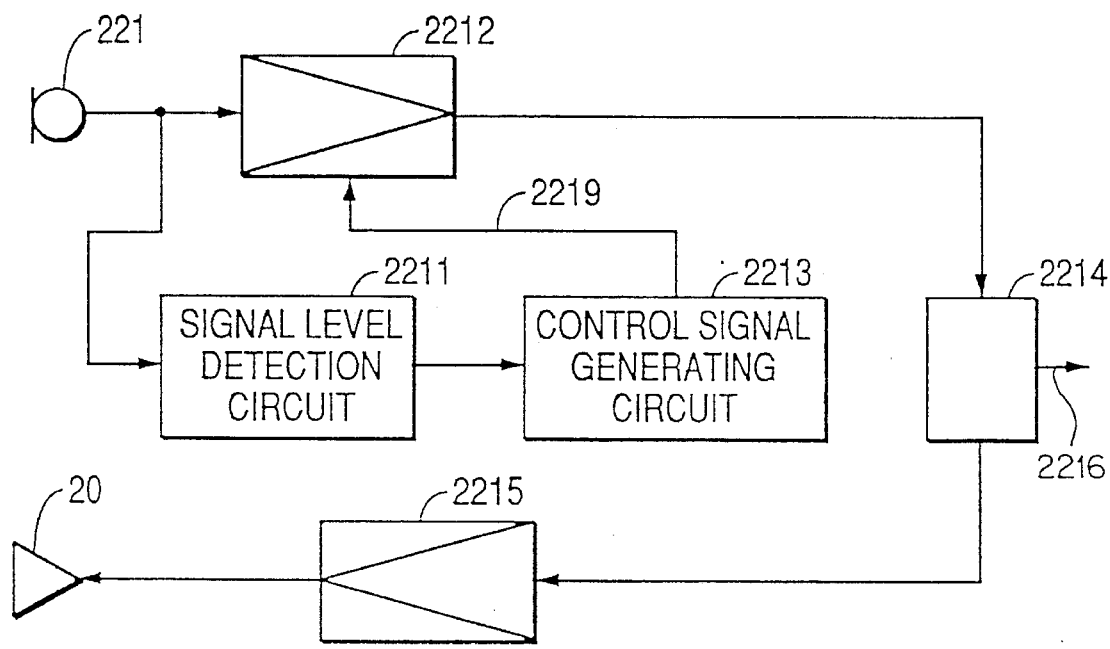
FIG. 22 is a block diagram of a circuit used in the earset of the present invention for reducing the degree of amplification of sound to less than 70 dBSPL.

FIG. 22 is a block diagram of a circuit used in any one of the earsets of the present invention for reducing the degree of amplification of signals of less than 70 dBSPL. Typically, people use telephones at a noise level of less than 70 dBSPL while the sound level to be picked up at the ear is approximately 80 dBSPL. An ordinary telephone assumes 94 dBSPL at a distance of 2.5 cm in front of the user's mouth. The circuit shown in FIG. 22 amplifies signals with a sound level of less than 70 dBSPL much less than signals with a sound level of 70 dBSPL or greater. Accordingly, ambient noise signals which typically have a sound level of less than 70 dBSPL will be amplified less than the voice signals of the user. Thus, ambient noise signals will be reduced.

The circuitry 220 shown in FIG. 22 includes a signal level detection circuit 2211 which receives an input signal at terminal 221. The input signal at terminal 221 is preferably either the output from one of the combination circuits shown in FIGS. 12–14, when a dual microphone earset is used, or the output from the bidirectional microphone 179, when such an embodiment of the earset is used. It is noted that the circuitry 220 can be placed at any convenient location within the earsets of the present invention so long as the input terminal 221 is provided with the output of either the combination circuit or the bi-directional circuit 179 and the output of the circuit 220 is led to the output wire.

The circuitry 220 further includes a logarithmic amplifier 2212, which amplifies the input signal. A non-linear signal generating circuit 2213, is coupled between the signal level detection circuit 2211 and the logarithmic amplifier 2212 and generates a control signal, depending on output signal level from the signal level detection circuit 2211.

The logarithmic amplifier 2212 is coupled to a dividing circuit 2214, which is common in typical telephones and divides the output from the logarithmic amplifier 12. Specifically, the output from the logarithmic amplifier 2212 is output to an amplifier 2215, which feeds signals to the speaker 20. The dividing circuit 2214 also outputs the signal from the logarithmic amplifier 2212 to a line 2216 which is connected to a telephone exchange. It is noted that line 2216 shown in FIG. 22 may be incorporated in line 50 shown in the embodiments of the earset of the present invention.

The circuit shown in FIG. 22 operates such that input at terminal 221 is fed into the signal level detection circuit 2211. The signal level detection circuit 2211 produces a control signal equal to the level of the input sound, which is then fed to the control signal generating circuit 2213. The control signal generating circuit 2213 generates a lower control signal when the input signal is less than 70 dBSPL and generates a higher control signal when the input signal is higher than 70 dBSPL.

Figure 23:
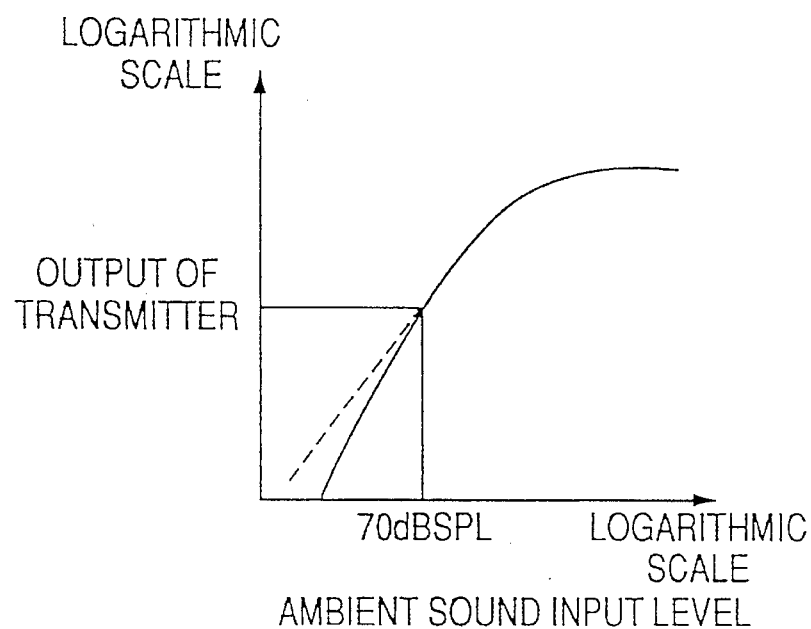
FIG. 23 is a graphical representation of the input-output characteristics of the circuit shown in FIG. 22.

This output is shown in FIG. 23, which shows a logarithmic plot of the relationship between output signals of the signal level detection circuit 2211 and the output signals of the non-linear signal generating circuit 2213. In FIG. 23, the output of the signal level detection circuit 2211 is shown on the horizontal axis while the output of the non-linear signal generating circuit 2213 is shown on the vertical axis.

The graph of FIG. 23 shows that the output of the control signal generating circuit 2213 controls the degree of the amplification of the logarithmic amplifier 2212. As a result, when ambient noise is low, the amplification of the amplifier 2212 becomes low, so that a small amount of sound is transmitted through the dividing circuit 2214 to the outside line 2216.

Additionally, there is a small amount of sound leaked to the amplifier 2215, resulting in a small amount of sound being leaked to the speaker 20. A further benefit of the circuit shown in FIG. 22 is that room reverberation is diminished because of the lower amplification of reverberated sound.

It is noted that the circuit shown in FIG. 22 can be applied to embodiments shown in FIGS. 4, 5 and 15 as well as to the embodiments shown in FIGS. 17–19. In any of the embodiments of the earset according to the present invention, the circuit shown in FIG. 22 preferably eliminates any weakness in the performance of the device owing to the distance between earset and the user's mouth. This is because by using the circuit shown in FIG. 22 in combination with the earset of the present invention, ambient noise is reduced and reverberated voice signals are eliminated.

The above described embodiments of the present invention implicitly refer to public wired telephone systems. However, it is to be understood that the embodiments of the present invention can be applied to any two-way simultaneous voice communication system such as wireless, portable, mobile and private systems.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A one piece two-way simultaneous voice transmitting and receiving device comprising:

a receiver for emitting sound primarily to the ear canal of a user; and a transmitter, coupled to the receiver, comprising:

a first microphone for sound pickup adapted to be located outside the ear canal at a first position relative to the mouth of the user and outputting a first signal; and a second microphone for sound pickup spaced from the first microphone and adapted to be located outside the ear canal at a second position relative to the mouth of the user farther from the mouth of the user than the first position and outputting a second signal;

subtracting means, coupled to the first and second microphones, for subtracting one of the first and second signals from the other and for outputting a third signal with a degree of amplification; and reducing means, coupled to the subtracting means, for reducing the degree of amplification of the third signal to a first extent if a sound level at said transmitter means is greater than a selected threshold and for reducing the degree of amplification of the third signal to a greater extent than the first extent when the sound level is less than the selected threshold.

2. The one piece two-way simultaneous voice transmitting and receiving device according to claim 1, wherein the reducing means comprises:

a signal level detection circuit which receives the third signal from an input terminal and which detects the level of the third signal;

a signal generating circuit, coupled to the signal level detection circuit, for outputting a control signal based on the level detected by the signal level detection circuit;

a logarithmic amplifier, coupled to the signal generating circuit, which receives the third signal and amplifies the third signal based on the control signal output from the signal generating circuit;

a dividing circuit, coupled to the logarithmic amplifier, which divides the amplified third signal;

an amplifier, coupled to the dividing circuit, which amplifies a first output of the dividing circuit and outputs an amplified signal to the receiver; and an output line, coupled to the dividing circuit, for outputting a second output of the dividing circuit to the transmitter.

3. A one piece two-way simultaneous voice transmitting and receiving device comprising:

an ear cover adapted to hang at the auricle of a user's ear;

a speaker attached to an inside portion of the ear cover and facing the entrance of the user's ear canal;

a transmitter, coupled to an outside portion of said ear cover, comprising:

a first microphone for sound pickup adapted to be located outside the ear canal at a first position relative to the mouth of the user and outputting a first signal; and a second microphone for sound pickup spaced a distance away from the first microphone and adapted to be located outside the ear canal at a second position relative to the mouth of the user farther from the mouth of the user than the first position and outputting a second signal;

subtracting means, coupled to the first and second microphones, for subtracting one of the first and second signals from the other and for outputting a third signal with a degree of amplification; and reducing means, coupled to the subtracting means, for reducing the degree of amplification of the third signal to a first extent if a sound level at said transmitter means is greater than a selected threshold and for reducing the degree of amplification of the third signal to a greater extent than the first extent when the sound level is less than the selected threshold.

* * * * *